J. C. POTTER.
BAR TURNING TOOL.
APPLICATION FILED DEC. 3, 1906.
1,028,605.
Patented June 4, 1912.
3 SHEETS—SHEET 1.
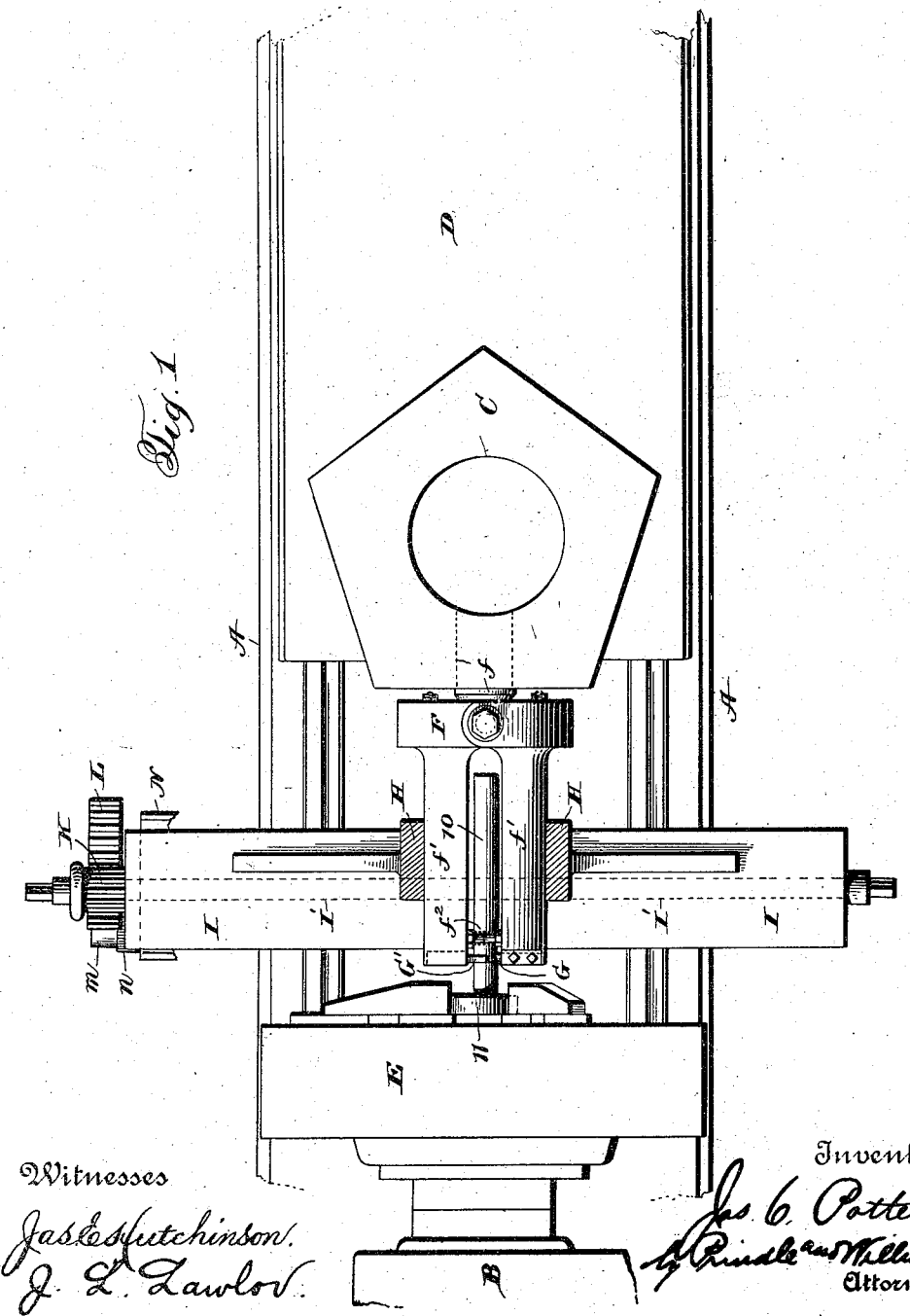

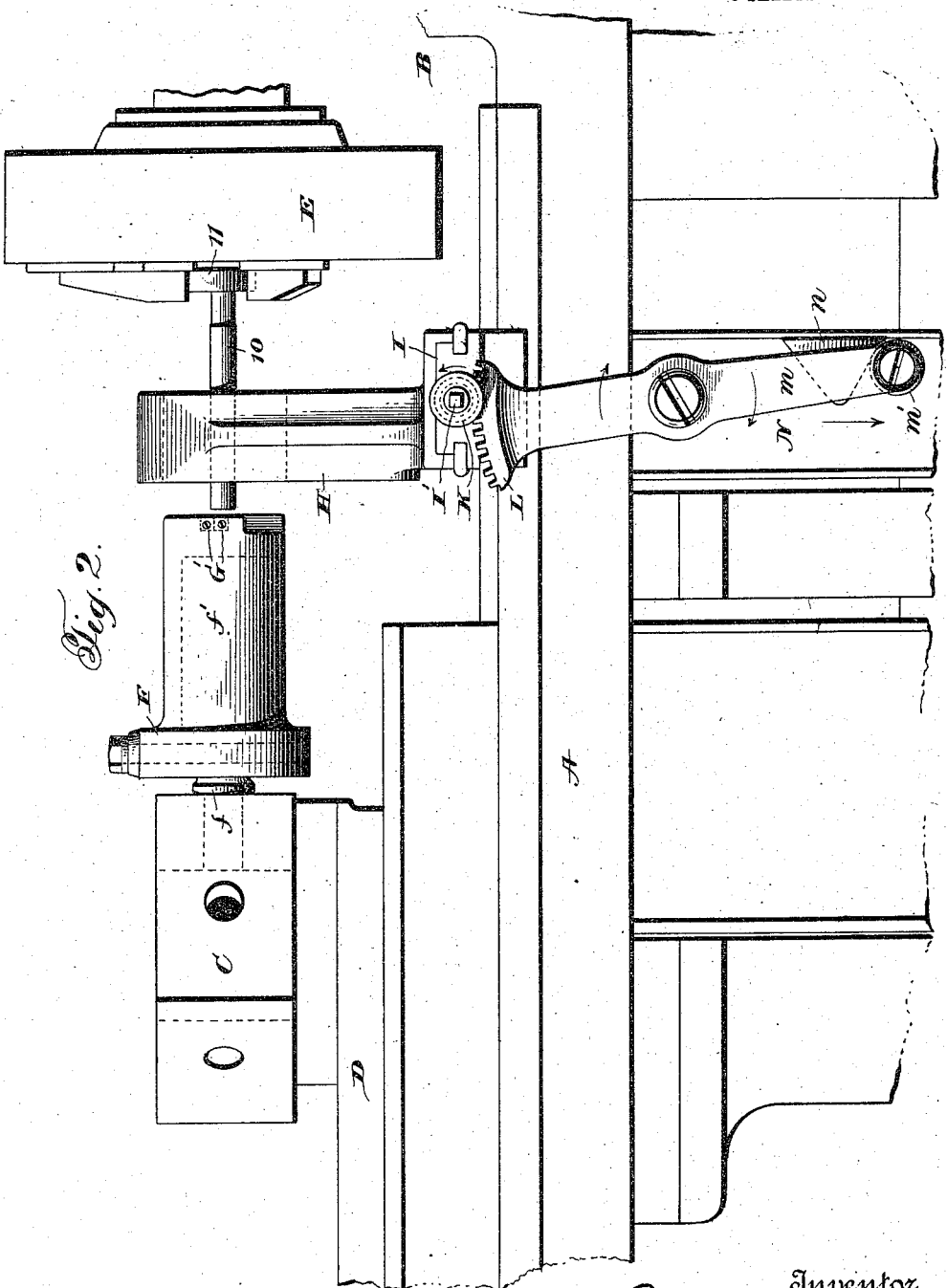

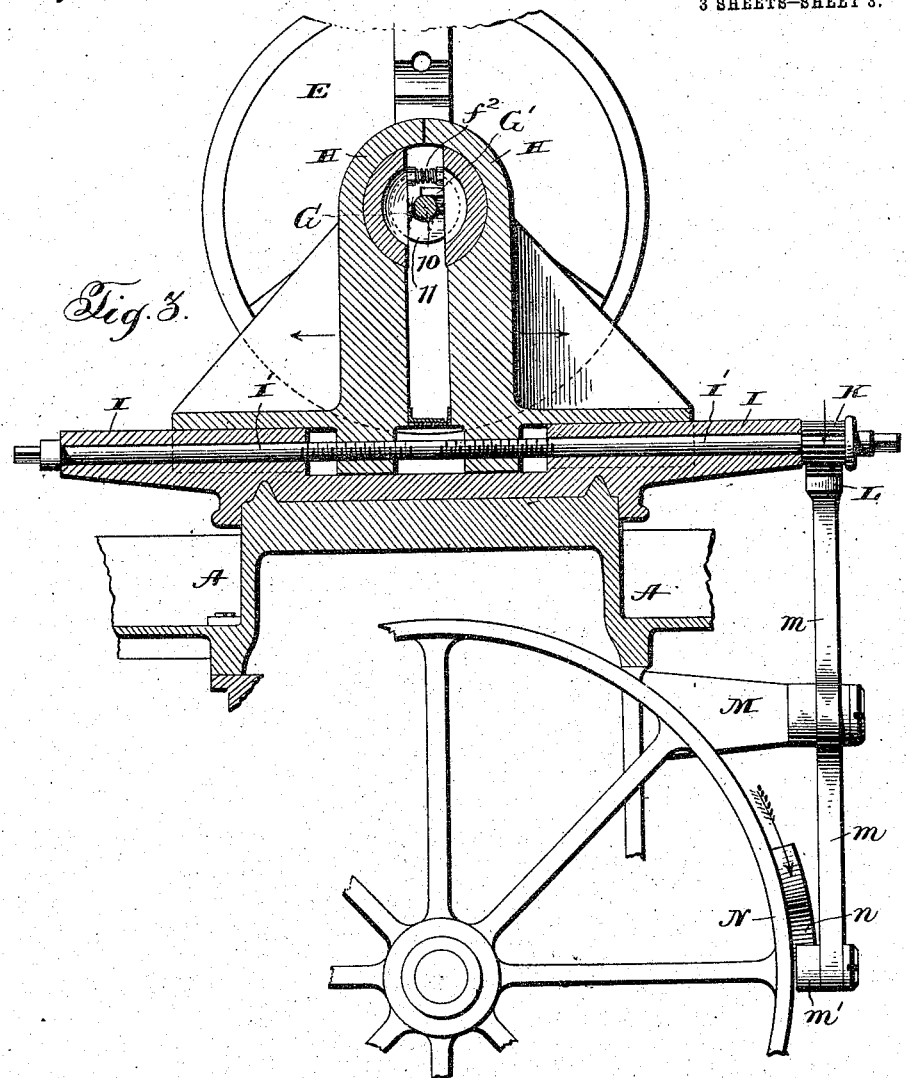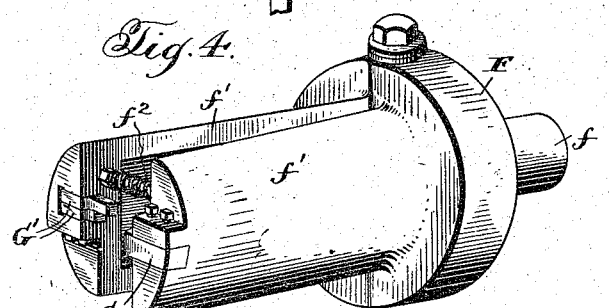

UNITED STATES PATENT OFFICE.

JAMES CHARLES POTTER, OF PAWTUCKET, RHODE ISLAND, ASSIGNOR TO POTTER & JOHNSTON MACHINE CO., OF PAWTUCKET, RHODE ISLAND, A CORPORATION OF RHODE ISLAND.

BAR-TURNING TOOL.

1,028,605.      Specification of Letters Patent.      Patented June 4, 1912.

Application filed December 3, 1906. Serial No. 346,086.

*To all whom it may concern:*

Be it known that I, JAMES C. POTTER, of Pawtucket, in the county of Providence and in the State of Rhode Island, have invented a certain new and useful Improvement in Bar-Turning Tools, and do hereby declare that the following is a full, clear, and exact description thereof, reference being had to the accompanying drawings, in which—

Figure 1 is a top plan view of portion of a turret lathe equipped with my bar-turning tool; Fig. 2 is a side elevation thereof; Fig. 3 a cross section through the tool closing and guiding device; and, Fig. 4 a detail perspective view of the tool alone.

The object of my invention is to provide a turning tool by which, in automatic lathes, or shaping machines, the cutting can be done beginning at a point at or near the chuck and proceeding therefrom outward, and to this end my said invention consists in the construction and combination of parts hereinafter specified and claimed.

In automatic lathes, as heretofore constructed, the cutting has proceeded from the outer portion of the work inward, or toward the chuck, a procedure which results in inferior or inaccurate work, especially where the piece operated on is long and slender, because the thrust of the cutting tool thereon causes it to move or bend laterally. By my invention I avoid this effect of the tool on the work.

I illustrate my invention as adapted to an automatic turret lathe, of well-known construction, having a suitable frame A, head stock B, and tool turret C mounted on a reciprocating slide D, by which the turret is moved toward and from the work in the chuck E. Secured to the turret, in a common way, as by a shank $f$ that enters one of the usual holes in the turret, is my turning tool which comprises a head F from which the shank $f$ projects, and two similar, semi-cylindrical blocks $f'$ that are hinged or pivoted at one end to the head with their flat sides toward each other, so that, when pressed together, the two blocks will be perfectly cylindrical. One of the blocks, on its forward end, carries a cutting tool G, while the other carries a pair of work-engaging shoes G', the cutting tool and shoes engaging the work when the two blocks are pressed together, and being out of engagement therewith when the two blocks are swung apart. The two blocks are yieldingly swung and held apart by means of a spring, which may be a coil spring $f^2$ interposed between them near their outer ends, and as automatic means are provided to close them, it will be seen that the cutting tool and shoes are automatically placed in and out of operating position.

For automatically closing the two blocks, I interpose a device between the turret and head stock that consists of a pair of semicircular, opposed, jaws H, mounted to slide transversely of the machine toward and from each other, to close upon and release the two blocks $f'$. When closed upon them they are pressed together to form a cylinder that closely fits the circular jaw openings, and the cutting tool thereby maintained in cutting position during travel over the work by the movement of the turret slide. The jaws H are mounted upon a block or bed I extending transversely of the machine, and each jaw is provided with a threaded opening or nut through which passes a screw I' having right and left thread to engage the respective jaw nuts so as to cause them to approach or recede from each other, according to the direction of revolution of the screw. On the end of the screw, at the rear of the machine, is a pinion K, with which meshes a gear segment L, pivoted to a bracket M, the segment having an arm $m$ carrying an anti-friction roller $m'$ which is engaged by cam plates $n$ on a drum N, the cam plates, by the revolution of the drum, acting to rock the gear segment L and thereby revolve the screw in one direction or the other, to close or open the jaws H in proper time.

In the use of the embodiment of my invention which I have shown and described, the work which, as shown, may be a long, slender, rod-like piece 10 having a head 11, after having been turned down a short distance from its head, is secured by its head in the chuck. The turret, then advancing toward the work, the blocks $f'$ expanded, or spread apart by the spring $f^2$, are moved or passed between the jaws H, which are opened, or separated for their passage, and over the work 10, until they reach the point where the cutter is to begin work, whereupon the jaws H are automatically moved together by the action of the cam drum N, to close the blocks and place the cutter in operating position on the work, whereupon the return movement of the turret slide will begin and the cutting proceed outward from the chuck toward the end of the work farthest therefrom, and the cutting having been completed, the jaws H will automatically open at the proper time and the blocks $f'$ will expand.

It, of course, will be understood that the particular construction and arrangement of parts which are shown in the drawings and described herein, is to be taken as illustrative of one embodiment of my invention, and not as being the only embodiment, and the scope of my appended claims is to be determined in the light of this statement.

Having thus described my invention, what I claim is:—

1. The combination of a chuck adapted to support work at one end, a slide traversable in a path that lies in the same direction in which the chuck axis lies, a laterally movable tool carrier mounted at one end on said slide and extending forward therefrom and carrying a tool at its forward free end, means for maintaining the tool carrier in a position to keep the tool away from the work during its travel toward the chuck, and automatic means to move said tool carrier laterally to place the tool in contact with the work when the travel toward the chuck reaches a predetermined point, the tool being inactive on the work when in its position away therefrom and cutting when it is in its inward position, and said slide, in one direction of travel, carrying the tool in a direction from the free end of the work toward the chuck, during which time the tool is inactive, and in its other direction of travel carrying the tool along the work during a cutting operation.

2. The combination of a chuck adapted to support work at one end, a slide traversable in a path that lies in the same direction in which the chuck axis lies, a laterally movable tool carrier pivotally mounted at one end on said slide and extending forward therefrom and carrying a tool at its forward free end, means for maintaining the tool carrier in a position to keep the tool away from the work during its travel toward the chuck, and automatic means to move said tool carrier laterally to place the tool in contact with the work when the travel toward the chuck reaches a predetermined point, the tool being inactive on the work when in its position away therefrom and cutting when it is in its inward position, and said slide, in one direction of travel, carrying the tool in a direction from the free end of the work toward the chuck, during which time the tool is inactive, and in its other direction of travel carrying the tool along the work during a cutting operation.

3. The combination of a chuck adapted to support work at one end, a slide traversable in a path that lies in the same direction in which the chuck axis lies, a laterally movable tool carrier mounted at one end on said slide and extending forward therefrom and carrying a tool at its forward free end, said tool carrier comprising two members situated on opposite sides of the work in the chuck, a pair of jaws movable crosswise of the path of travel of the slide situated to engage the tool carrier members when a predetermined point in the travel toward the chuck is reached, and automatic means to reciprocate said jaws.

4. The combination of a chuck adapted to support work at one end, a turret traversable in a path that lies in the same direction in which the chuck axis lies, a tool carrier composed of two members pivotally mounted at one end on the turret and projecting free therefrom on opposite sides of the work, said tool carrier having a tool at its forward free end, a spring device normally spreading said members apart, and a pair of jaws located on opposite sides of said carrier and movable toward and from the same.

In testimony that I claim the foregoing I have hereunto set my hand.

JAMES CHARLES POTTER.

Witnesses:
MITCHELL ADAMS,
CHAS. H. W. ROBERTS.

---

Copies of this patent may be obtained for five cents each, by addressing the "Commissioner of Patents, Washington, D. C."